United States Patent [19]

Kuragano et al.

[11] Patent Number: 5,065,348
[45] Date of Patent: Nov. 12, 1991

[54] METHOD AND SYSTEM FOR TRANSFORMING A FREE CURVED SURFACE

[75] Inventors: Tetsuzo Kuragano, Tokyo; Akira Suzuki; Nobuo Sasaki, both of Kanagawa, Japan

[73] Assignee: Sony Corporation, Tokyo, Japan

[21] Appl. No.: 656,012

[22] Filed: Feb. 14, 1991

Related U.S. Application Data

[63] Continuation of Ser. No. 262,492, Oct. 25, 1988, abandoned.

[30] Foreign Application Priority Data

Oct. 26, 1987 [JP] Japan .............................. 62-269995
Oct. 30, 1987 [JP] Japan .............................. 62-276925
Nov. 2, 1987 [JP] Japan .............................. 62-278694

[51] Int. Cl.$^5$ .............................................. G06F 15/62
[52] U.S. Cl. .......................................... 364/119; 395/142
[58] Field of Search ......................... 364/518, 521, 522; 340/729, 723

[56] References Cited

U.S. PATENT DOCUMENTS

| | | | |
|---|---|---|---|
| 3,524,049 | 8/1970 | Gotz et al. | 364/719 |
| 3,634,667 | 1/1972 | Okamoto et al. | 364/719 |
| 3,809,868 | 5/1974 | Villalobos et al. | 364/518 |
| 3,882,304 | 5/1975 | Walters | 364/474.05 |
| 3,917,932 | 11/1975 | Saita et al. | 364/718 |
| 4,031,369 | 6/1977 | Heaman et al. | 364/474.31 |
| 4,162,527 | 7/1979 | Kilbane et al. | 364/474 |
| 4,283,765 | 11/1981 | Rieger | 364/521 |
| 4,355,223 | 10/1982 | Inoue et al. | 219/69.17 |
| 4,423,481 | 12/1983 | Reid et al. | 364/474 |
| 4,445,182 | 4/1984 | Morita et al. | 364/474 |
| 4,539,648 | 9/1985 | Schatzki | 364/555 |
| 4,623,977 | 11/1986 | Schrieber | 364/577 |

FOREIGN PATENT DOCUMENTS 0075031 3/1983 European Pat. Off. .
62-22681 10/1987 Japan .
1187426 4/1970 United Kingdom .

*Primary Examiner*—Heather R. Herndon
*Attorney, Agent, or Firm*—Philip M. Shaw, Jr.

[57] ABSTRACT

A free curved surface generating system and method in which a plurality of cross sectional curves representing cross sectional shapes in an x-y coordinate system are generated, the plurality of cross sectional curves are arranged at desired positions in the x-y-z coordinate system, respectively, and thereafter a curved surface is formed between mutually adjacent cross sectional curves through an interpolation to generate the free curved surface are disclosed. In the free curved surface generating system and method, when the parallel translations and rotations are carried out for the generated cross sectional curves in the x-y-z coordinate system, the parallel translations and rotations are stored for each cross sectional curve into a memory and each cross sectional curve is parallel translated and rotated on the basis of data on the parallel translations and rotations for the corresponding cross sectional curve stored in the memory when the cross sectional curves are moved again into the x-y-z coordinate system.

10 Claims, 14 Drawing Sheets

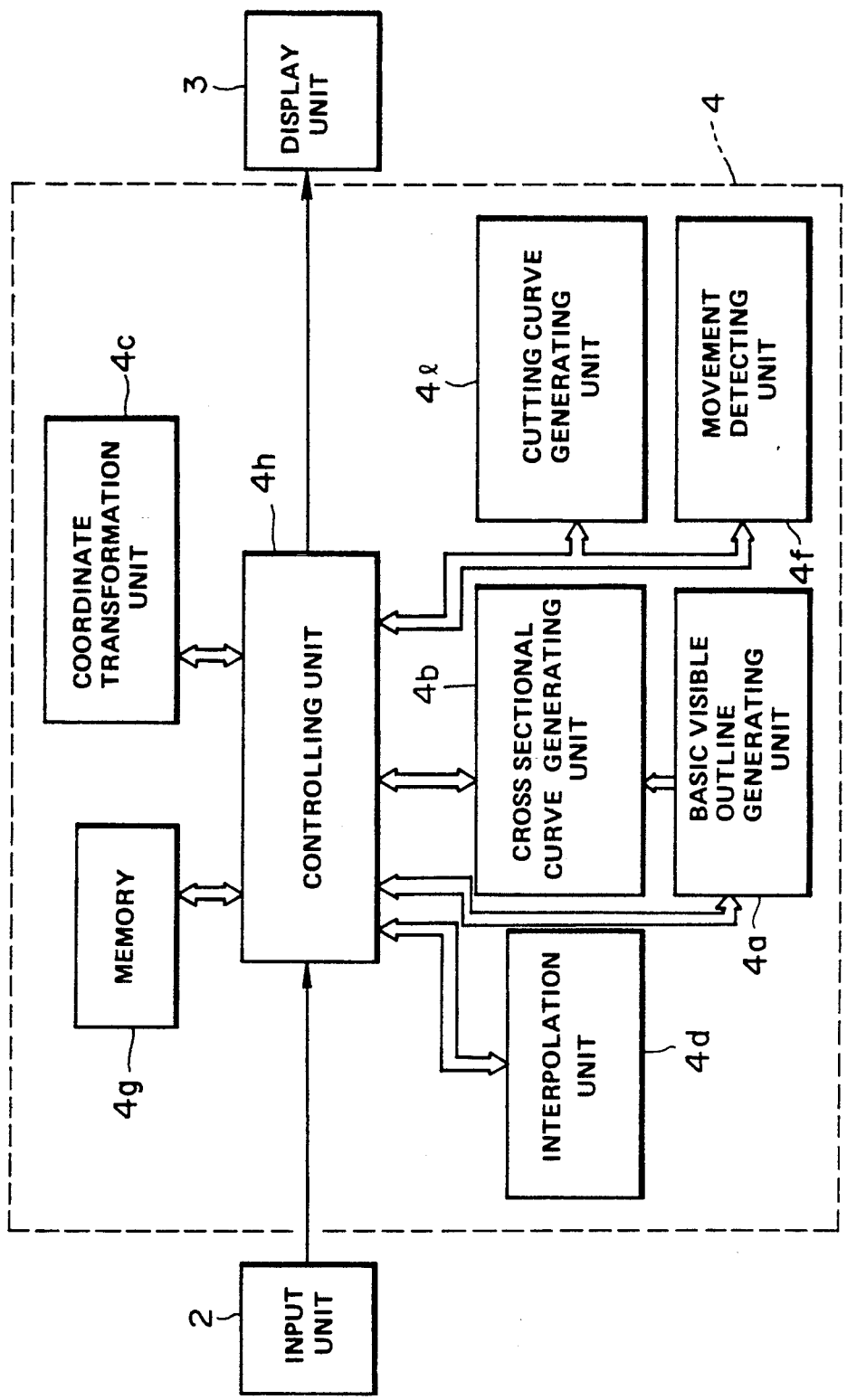

| ELEMENT | SEGMENT DATA HEAD ADDRESS STORAGE AREA 6 | SEGMENT DATA NUMBER STORAGE AREA 7 | ROTATIONS STORAGE AREA 8 | | | | TRANSLATIONS STORAGE AREA 9 | | | |
|---|---|---|---|---|---|---|---|---|---|---|
| Sc1 | 1 | 3 | | | | | | | | |
| Sc2 | 4 | 2 | | | | | | | | |
| Sc3 | 6 | 5 | | | | | | | | |

| ADDRESS | SEGMENT DATA STORAGE AREA 5 IN x, y COORDINATE SYSTEM | SEGMENT DATA STORAGE AREA 10 IN x, y, z COORDINATE SYSTEM |
|---|---|---|
| 1 | | |
| 2 | | |
| 3 | | |
| 4 | | |
| 5 | | |
| 6 | | |
| 7 | | |
| 8 | | |
| 9 | | |
| 10 | | |
| 11 | | |
| 12 | | |

FIG. 9

METHOD AND SYSTEM FOR TRANSFORMING A FREE CURVED SURFACE

This is a continuation of co-pending application Ser. No. 262,492 filed on Oct. 25, 1988.

BACKGROUND OF THE INVENTION (1) Field of the Invention

The present invention relates to a system and method for generating a free curved surface and specifically relates to a free curved surface generating system and a method which facilitates a correction of the free curved surface.

(2) Background of the Art

Various free curved surface generating systems have been proposed in which three-dimensional image information previously written into a memory is processed via transformation to construct a solid figure image which is to be three-dimensionally displayed on a raster scanned display screen of a display unit.

In such kinds of free curved surface generating systems, a plurality of cross sectioned curves, indicating the cross sectional shape at a plurality of arbitrary positions of the solid of the figure to be generated, are generated in an x-y coordinate system. These cross sectional curves are arranged at desired positions in an x-y-z coordinate system. Free surfaces are formed between these cross sectional curves through interpolations, and data representing the solid of the figure constituted by the free curved surfaces are prepared.

A multiple number of coordinate transformations for cross sectional curves are carried out between the x-y coordinate system and the x-y-z coordinate system and then the shapes of the cross sectional curves are corrected so as to generate a free curved surface of a desired shape.

However, at this time, rotations (angular quantities through which the cross sectional curves are rotated) and parallel translations for the cross sectional curves individually and repeatedly need to be set by a designer whenever the cross sectional curves are transformed from the x-y coordinate system into the x-y-z coordinate system and vice versa. Therefore, the correcting operations carried out by the designer, for correcting the cross sectional curves, become troublesome.

In addition, for example, through a technique disclosed in a Japanese Patent Application First Publication sho 62-226281 published on Oct. 5, 1987 the profile of the free surface is corrected in the x-y-z coordinate system and thereafter cross sectional curve(s) for the corrected part(s) need to be transformed into the x-y coordinate system in order to visually inspect the profile of the cross section. In this case, the designer similarly needs to set the rotations and parallel translations of the corrected cross sectional curves. Hence, as well as in this case, the designer's correcting operations for the free curved surface becomes complicated and troublesome.

SUMMARY OF THE INVENTION

It is a main objective of the present invention to provide a system and a method for generating a free curved surface which can easily transform data, indicating the cross sectional shape of a free curved surface, between an x-y coordinate system and x-y-z coordinate system.

It is another objective of the present invention to provide a system and a method for generating a free curved surface which can easily set the size of the cross sectional shape of the free curved surface to a desired value.

The above-described objects can be achieved by providing a system and method for generating a free curved surface wherein a plurality of cross sectional curves representing the cross sectional shape in an x-y coordinate system are prepared, the plurality of cross sectional curves are parallel translated and rotated in an x-y-z coordinate system; the data of the parallel translations and rotations for the respective cross sectional curves is stored in corresponding storage areas of a memory; and thereafter the respective cross sectional curves are again rotated and translated on the basis of the stored data of rotations and parallel translations when a coordinate transformation between the x-y coordinate system and x-y-z coordinate system is carried out for the same cross sectional curves. Another object of the invention is to provide a system and method for translating digital data representing a free curved surface, in the x-y-z coordinate system or a free curved surface in the x-y coordinate system, into a visually perceptible curved surface representative thereof.

The above-described objectives can also be achieved by providing a system and method for generating the free curved surface wherein a basic outline representing a rough outer shape is generated in the x-y coordinate system; control points on the basic outline are specified; and a parametric curve, generated between the control points, serves as one cross sectional curve.

BRIEF DESCRIPTION OF THE DRAWINGS

FIG. 1 is a schematic block diagram representing a preferred embodiment of a system for generating a free curved surface according to the present invention.

FIG. 9 is a schematic diagram for explaining memory locations in a memory, shown in FIG. 1 of the system, in which data on each cross sectional curve is stored.

DETAILED DESCRIPTION OF THE PREFERRED EMBODIMENTS

Figure 3:
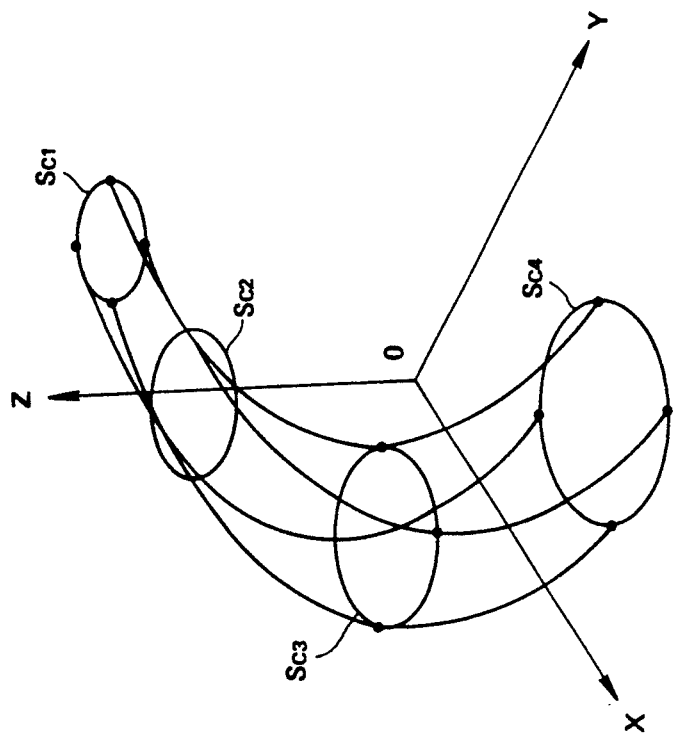
FIG. 3 is a schematic diagram representing a state in which a plurality of cross sectional curves are arranged at a desired position in an x-y-z coordinate system.

Reference will hereinafter be made to the drawings in order to facilitate understanding of the present invention.

FIG. 1 shows a preferred embodiment of a system for generating a free curved surface according to the present invention.

In FIG. 1, the free curved surface generating system generally denoted by 1 includes an input unit 2 (for example, a keyboard) for inputting various data and instructions to be described layer, an arithmetic operation processing unit 4 for generating cross sectional curves and free curved surfaces on the basis of the data inputted from the input unit 2, and a display unit 3 for displaying the generated cross sectional curves and free curved surface to be described later.

The arithmetic operation processing unit 4 functionally includes: basic outline generating unit (first means) 4 a for generating the basic outline which serves as a basic outline when one cross sectional curve is generated; cross sectional curves generating unit (second means) 4 b for generating each of cross sectional curves in the x-y coordinate system on the basis of the basic outline; coordinate transforming unit (third means) 4 c for carrying out a transformation of the cross sectional curves between the x-y coordinate (two dimensional space) system and an x-y-z coordinate (three dimensional space) system on the basis of set rotations and parallel translations; interpolation unit (fourth means) 4 d for interpolating curved surfaces between the plurality of cross sectional curves which have been transformed from the x-y coordinate system to the x-y-z coordinate system to form the free curved surface; cut curved surface generating unit (fifth means) 4 e for generating cut curves through the cut of the cross sectional curves at an arbitrary position, movement detecting unit 4 f (sixth means) for detecting the rotations and parallel translation required to transform the cut curves into the x-y coordinate system; memory 4 g (seventh means) for storing each kind of data to be described later, and controlling unit (eighth means) 4 h for controlling each operation of the above-described units, i.e., the first to seventh means 4 a to 4 g.

Figure 2:
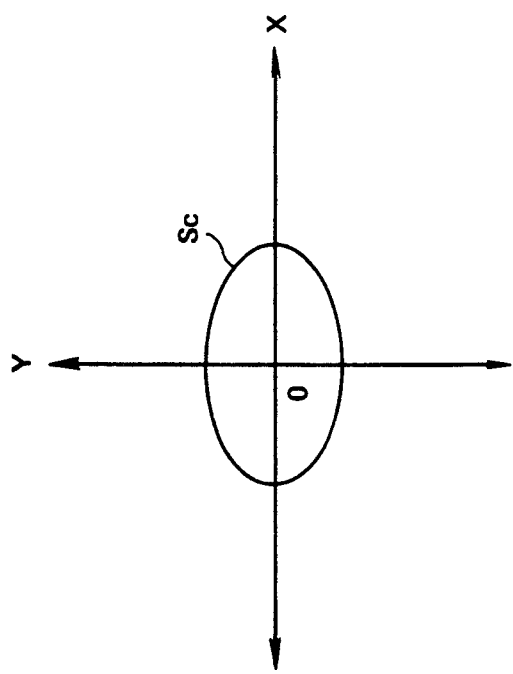
FIG. 2 is a schematic diagram representing generation of a cross sectional curve in an x-y coordinate system.

The arithmetic operation processing unit 4 generates each one of the cross sectional curves $S_c$ shown in FIG. 2 on the basis of coordinate data inputted sequentially via the input unit 2 on a reference plane of the x-y coordinate system and thereafter arranges a series of the cross sectional curves $S_{ci}$ (i=1, 2, 3,—) as shown in FIG. 3 at desired positions in the x-y-z coordinate system in accordance with a series of processing procedures to be described later.

First, a method for forming one cross sectional curve $S_c$ on the reference plane of the x-y coordinate system will be described below with chief reference to FIGS. 2, 4 and 5.

It is noted that when a rough sketch of a cross sectional shape to be generated is specified through the basic visible outline generating unit 4 a, an outer dimension of each part of the cross sectional shape can be specified.

Figure 4:
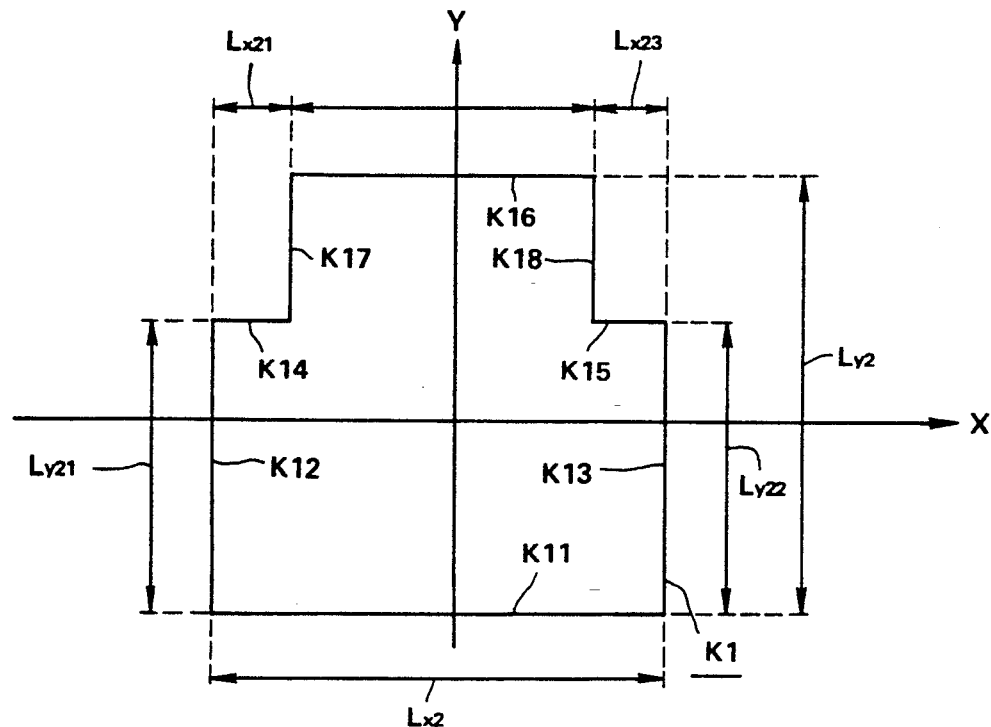
FIG. 4 is a schematic diagram representing a state in which a basic outline is formed in the x-y coordinate system according to the present invention.

For example, as shown in FIG. 4, a basic outline K1 of a polygon is specified having an outer dimension of $L_{x2}$ in the x axis direction, and an outer dimension of $L_{y2}$ in the y axis direction, and each line segment thereof being formed in a straight line.

The basic outline K1 in the preferred embodiment is such that a left-side line segment K12 and a right-side line segment K13 have respectively, a length of $L_{y21}$ and a length of $L_{y22}$ in the y axis direction from left and right ends of a lower-side line segment K11 extending in the x axis direction; cut-in line segments K14 and K15 are extended inwardly from respective upper ends of the line segments K12, K13 and have lengths $L_{x21}$ and $L_{x23}$, respectively, cut-in line segments K17, K18 extend vertically from the inner ends of the line segments K14, K15 upward to upper-side line segments K16.

A designer specifies a rough sketch of the outer shape as a polygon-formed basic outline K1 described above and thereafter inputs radius information corresponding to each corner present on the basic outline K1 required to generate the cross sectional curve $S_c$ to the cross sectional curves generating unit 4 b in FIG. 1, thus generating a desired cross sectional curve (denoted by a solid line of FIG. 5) based on the basic outline K1. This is carried out via the input unit 2.

Figure 5:
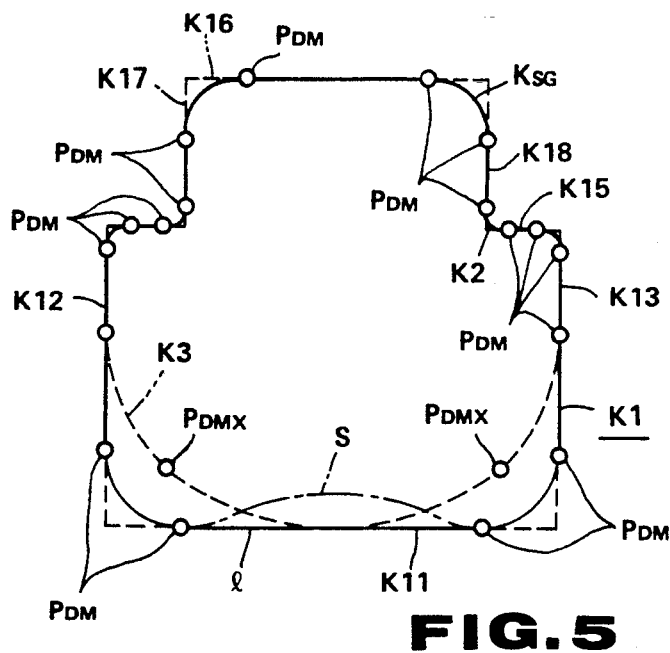
FIG. 5 is a schematic diagram representing an x-y coordinate state wherein one cross sectional curve is generated on the basis of the basic outline illustrated in FIG. 1 according to the present invention.

As shown in FIG. 5, a curve segment $K_{SG}$ in an arc form generated at each corner of the basic outline K1 is generated by means of a Bezier curve representing a parametric free curve.

It is noted that a curve segment $K_{SG}$ is generated between each pair of a plurality of deforming control points $P_{DM}$ on the basic outline K1, as shown in FIG. 5.

Figure 6:
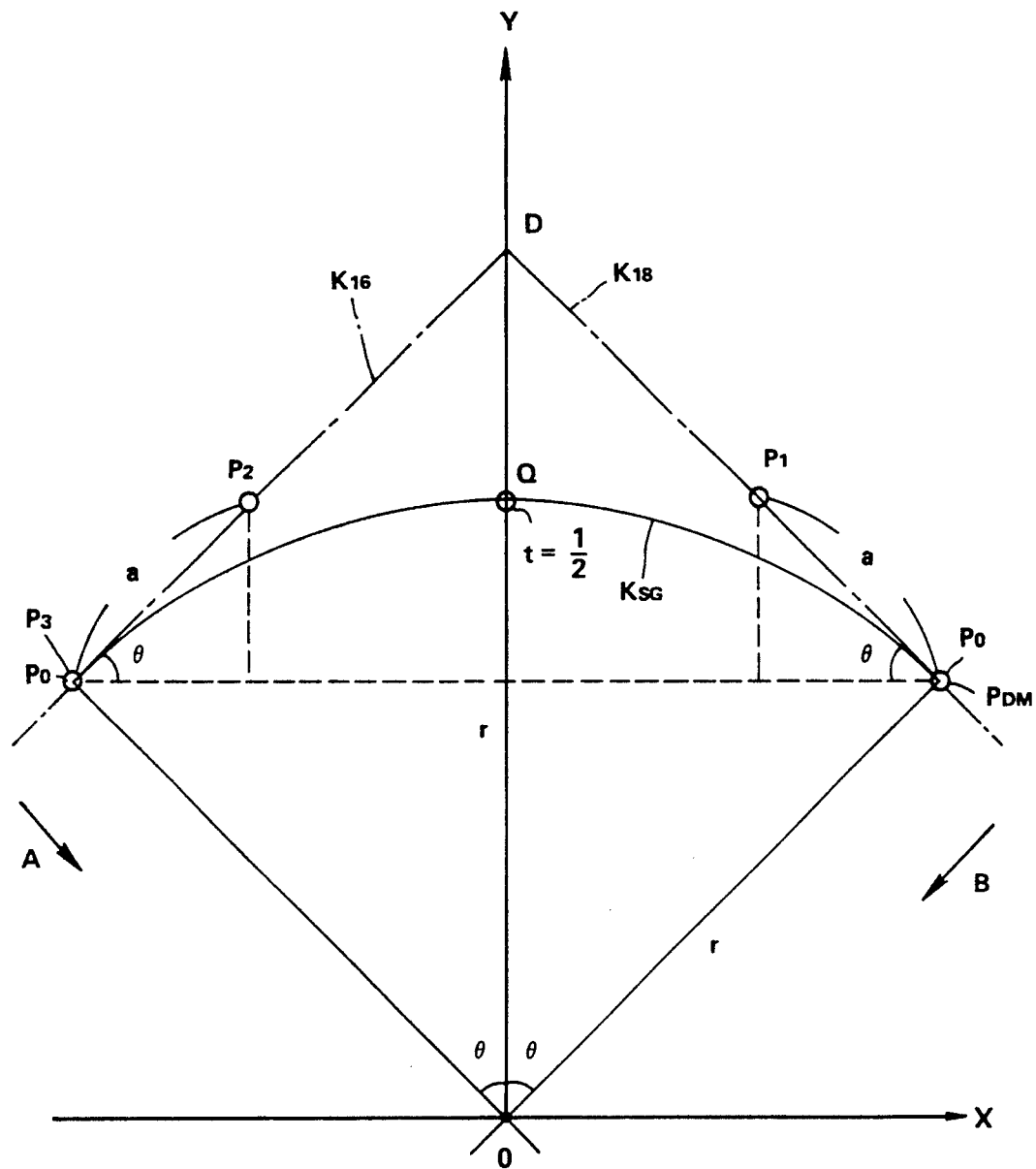
FIG. 6 is a schematic diagram representing an x-y coordinate state in which a curve segment is generated on the basis of a plurality of control points located on the cross-sectional curve of FIG. 5, according to the present invention.

That is to say, as shown in FIG. 6, each curve segment $K_{SG}$ is expressed as follows, supposing that one deforming control point $P_{DM}$ is a reference control point $P_o$.

$$R(t) = (1-t+tE)^3 P_o \cdots \quad (1)$$

$R(t)$: a positional vector indicating the corresponding curve segment $K_{SG}$.

t: in a case where the other deforming control point $P_{DM}$ is another reference control point $P_3$, t denotes a parameter changing from 0 to 1 between a distance from the reference control point $P_o$ to the other reference control point $P_3$ ($0 \leq t \leq 1$).

E: denotes a shift operator and the following relationship is established by setting control points $P_1$ and $P_2$ between the two reference points $P_o$ and $P_3$:

$$E P_i = P_{i+1} \ (i=0, 1, 2, \cdots) \cdots \quad (2)$$

When the equation (1) is developed, the following equation is established.

$$\begin{aligned} R(t) &= \{(1-t)^3 + 3(1-t)^2 tE + 3(1-t) \\ & \quad t^2 E^2 E^2 + t^3\} P_o \\ &= (1-t)^3 P_o + 3(1-t)^2 tE P_o + \\ & \quad 3(1-t) t^2 E^2 P_o + t^3 E^3 P_o \\ &= (1-t)^3 P_0 + 3(1-t)^2 t P_1 + \\ & \quad 3(1-t) t^2 P_2 + t^3 P_3. \end{aligned} \quad (3)$$

In this way, all curve segments $K_{SG}$ can be represented by four control points $P_0$, $P_1$, $P_2$ and $P_3$ on the basis of the equation (3). This means that if two control points $P_1$ and $P_2$ are selected at arbitrary positions located between the two reference points $P_o$ and $P_3$ the shape of the curve segment $K_{SG}$ can be locally set as an arbitrary free curve.

As appreciated from FIG. 5, on the basis of the data of the basic outline K1 constituted by any polygon inputted by the designer via the input unit 2, a pair of the reference points $P_0$ and $P_3$, which determine the dimensional range of the curve segment $K_{SG}$, is specified so that a curve inscribing the basic outline K1 can be generated. Thus, the designer can design a desired form by using the outer dimensions as a predetermined design requirement.

In addition, the curve segment $K_{SG}$ can be formed for each curve segment without limiting its shape based on the shape of the adjacent curve segment. Thus, the free curved surface generating system can easily generate a curved segment even if the curved segment is formed having an acute corner between the adjacent curved segments $K_{SG}$ (for example, in a case where an arc having an extremely different radius from the curved segment is adjoined).

Figure 7A:
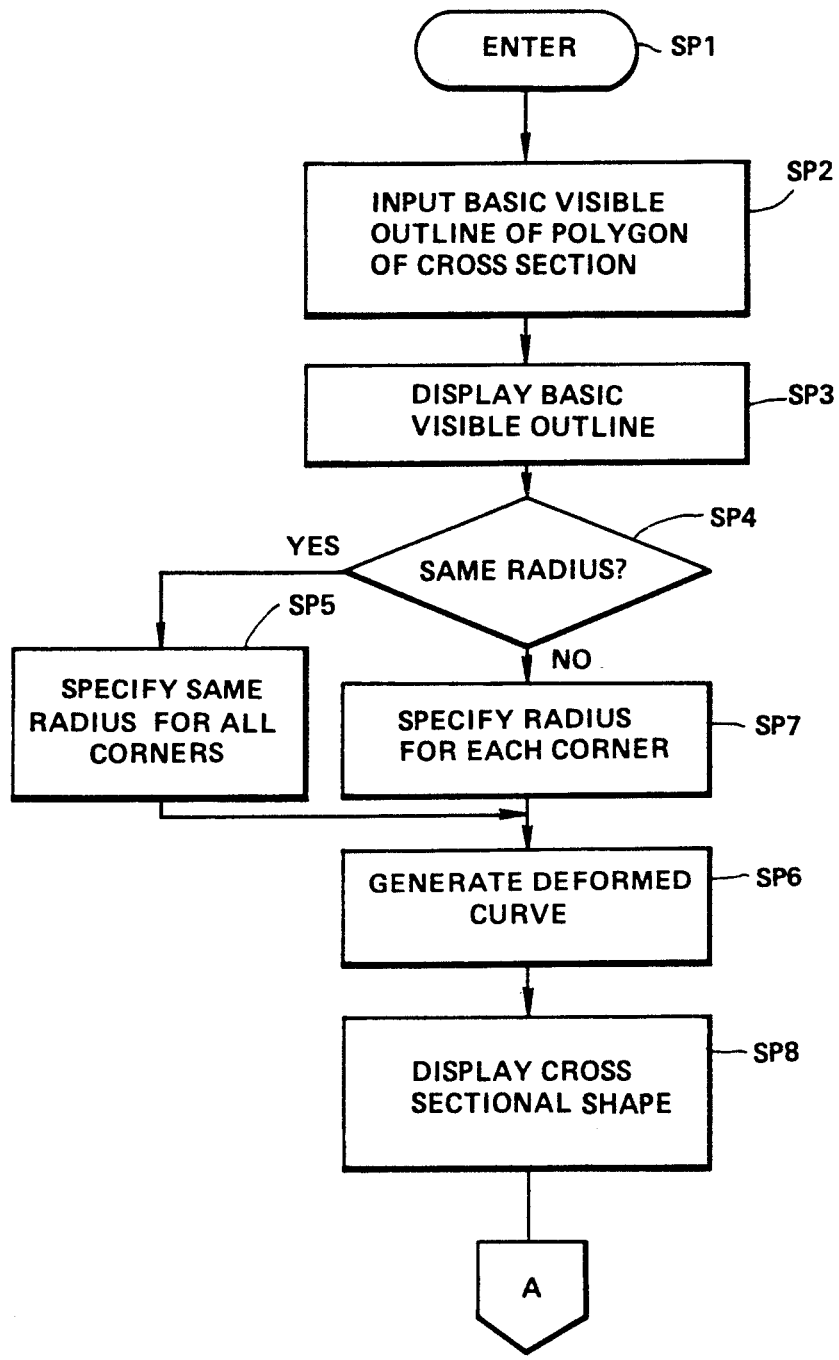
FIGS. 7 (A) and 7 (B) are integrally a flowchart for explaining the procedure for generating one cross sectional curve from the basic outline depicted in FIGS. 4 and 5 according to the present invention.
Figure 7B:
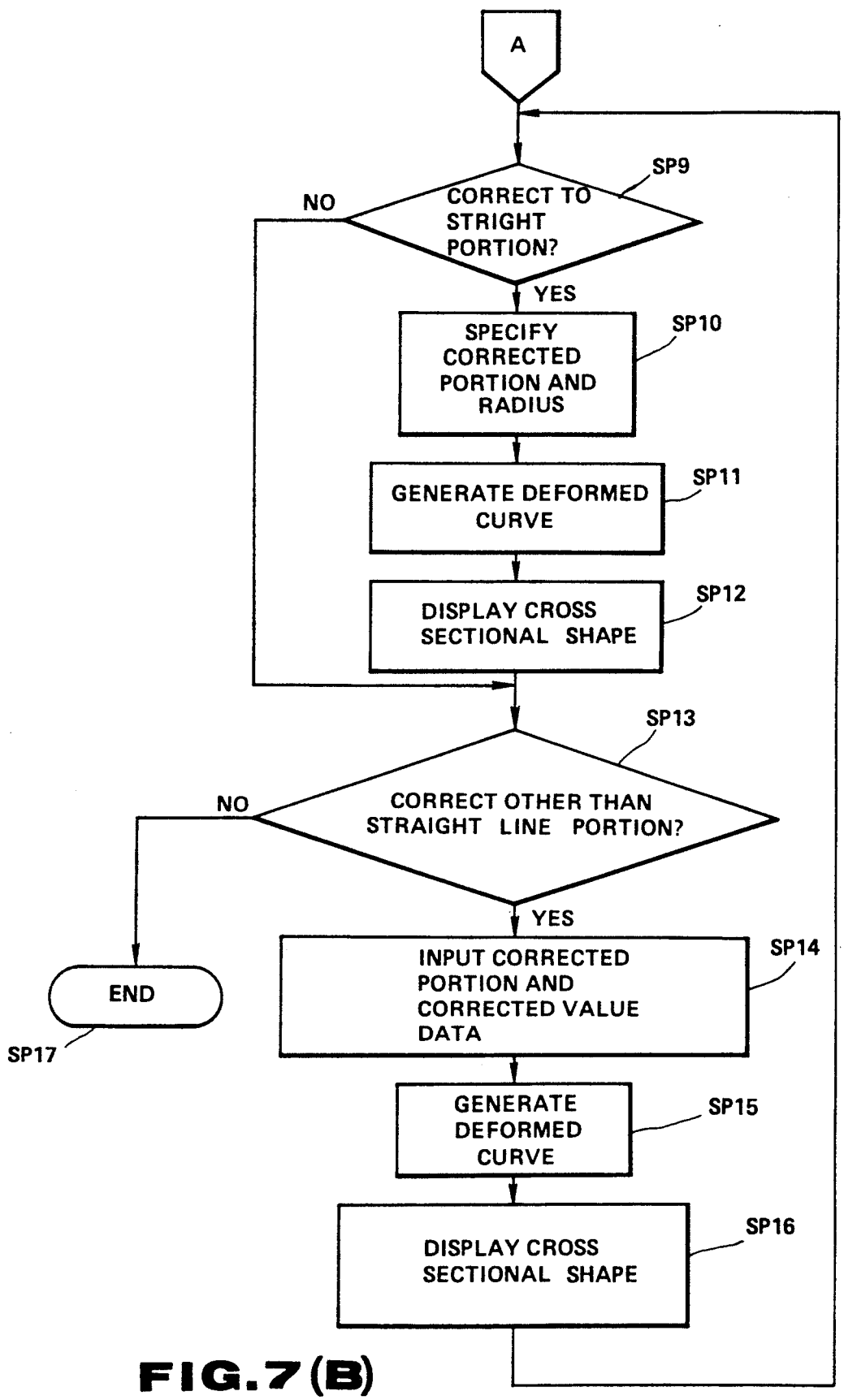

The basic outline generating unit 4 a and cross sectional curve generating unit 4 b shown in FIG. 1 generate the cross sectional shape on the basis of the above-described cross sectional shape generating method in accordance with the processing routine shown in FIGS. 7 (A) and 7 (B).

In a step SP 1, the routine enters the cross sectional shape generating processing program, and the basic outline generating unit 4 a waits for the data basic outline K1 to be input, in the form of a polygon representing a cross section, by the designer through the input unit 2 in step SP 2.

At this time, the designer inputs the coordinate data of apexes present at both ends of each line segment forming the basic outline K1 as described above with reference to FIG. 2 so as to enable the input of the rough sketch of cross section in the polygonal shape.

Upon completion of the data input, in the free curved surface generating system 1, the routine goes to step SP 3 in which the outer shape formed by linking the apexes inputted with the respective line segments K11 to K18 is displayed on the display unit 3 and the routine goes to step SP 4.

In the step SP 4, the cross sectional curve generating unit 4 b in FIG. 1 waits to receive an instruction indicating whether the radius of each corner of a deformed curve K2 should be the same or whether the radius at each corner should be specified. The designer inputs the instruction indicating an acknowledgement (Yes) or negative acknowledgement (No) via the input unit 2 to the cross sectional curve generating unit 4 b on the basis of a designer's design feeling.

If the cross sectional curve generating unit 4 b receives the positive acknowledgement in step SP 4, the routine goes to step SP 5 in which the unit 4 b waits to receive radius data, to be applied to all corners, from the designer via the input unit 2. The routine goes to step SP 6 when the specified radius data is inputted.

On the other hand, if the negative acknowledgement (No) is received, in step SP 4, by the cross sectional curve generating unit 4 b, the routine goes to step SP 7 in which the unit 4 b waits to receive from the designer, via the input unit 2 radius data for each corner. The input unit 2 and the routine goes to step SP 6 when the specification of radius data has ended.

The processing carried out in the step SP 6, (i.e., the theory of operation of generating the curve segment $K_{SG}$ on the basis of the radius data by the cross sectional curve generating unit 4 b) will be described with reference to FIG. 6.

Suppose that the basic outline line segments K16, K18 are parallel translated in the "A" direction and the "B" direction, as indicated by the arrows in FIG. 6, by a distance equal to the radius r of the curve segment $K_{SG}$ to be generated. The parallel translated basic outline segments K16, K18 intersect at origin O of the x-y coordinate system.

Next, suppose that a perpendicular line is extended out from the origin O. The perpendicular line intersects the basic outline segments K16 and K18 at basic control points $P_o$ and $P_3$.

Suppose that control points $P_1$, $P_2$ are provisionally set on a line segment extending toward an intersection D of the basic outline K16 and the basic outline K18 from the reference control points $P_0$, $P_3$ and the distances from the reference control point $P_0$ to the control point $P_1$ and from the reference control point $P_3$ to the control point $P_3$ are equally denoted by a.

Suppose that an angle contained between the line segment extended from the origin O to the intersection D and the line segment extended rom the origin 0 to the reference control point $P_0$ is denoted by $\theta$ and an angle contained between the line segment extended from the origin 0 to the intersection D and the line segment extended from the origin 0 to the reference control point $P_3$ is also denoted by $\theta$. The coordinates of the reference control points $P_0$ and $P_3$ can be expressed as follows;

$$P_0 = (r \sin \theta, r \cos \theta) \cdots (4)$$

$$P_3 = (-r \sin \theta, r \cos \theta) \cdots (5)$$

On the other hand, the coordinates of provisionally set control points $P_1$ and $P_2$ are expressed as follows.

$$P_1 = (r \sin\theta - a \cos\theta, r \cos\theta + a \sin\theta) \cdots \quad (6)$$

$$P_2 = (-r \sin\theta + a \cos\theta, r \cos\theta + a \sin\theta) \cdots \quad (7)$$

As described above, the curve generated on the basis of the coordinate data on the four control points $P_0$, $P_1$, $P_2$, $P_3$, and $P_4$ can be expressed in the above-described equation (3).

$$R(t) = (1-t)^3 P_0 + 3(1-t)^2 t\, P_1 + 3(1-t)t^2 P_2 + t^3 P_3$$

Suppose that the intersection between the line segment passing through the origin 0, the intersection D, and the curve segment $K_{SG}$ to be generated is denoted by Q. A position vector R (t) of the intersection Q can be expressed in the equation (3) if $t = \frac{1}{2}$.

$$\begin{aligned} R(1/2) &= 1/8\, P_0 + 3/8\, P_1 + 3/8\, P_2 + 1/8\, P_3 \quad (8) \\ &= 1/8\, (r \cos\theta) + 3/8\, (r \cos\theta + a \sin\theta) + \\ &\quad 3/8\, (r \cos\theta + a \sin\theta) + 1/8\, (r \times \cos\theta) \\ &= r \cos\theta + 6/8\, a \sin\theta \end{aligned}$$

It is noted that since the x axis coordinate of the intersection Q is zero, the coordinates of the intersection Q is (0, r). Hence, the equation (8) can be expressed as follows.

$$r = r \cos\theta + 6/8\, a \sin\theta \cdots \quad (9)$$

When the symbol a is derived from the equation (9), the symbol a can be expressed as follows:

$$a = 4/3 [r(1-\cos\theta)/\sin\theta] \cdots \quad (10)$$

Hence, the distance between the reference control point $P_0$ and control point $P_1$ and the distance between the reference control point $P_3$ and control point $P_2$ are determined from the equation (10) by the angle between a vector, having a length of the radius r of the curve segment $K_{SG}$ to be generated, going from the origin 0 to the intersection D and a vector going from the origin 0 to the reference control point $P_0$.

When the symbol a derived in the way described above is substituted into the equations (6) and (7), the position vectors $P_1$ and $P_2$ of the control points $P_1$ and $P_2$ can be determined.

When the control points $P_0$, $P_2$, $P_3$, and $P_4$ derived as described above are substituted into the equation (3) and the parameter t is changed at a predetermined interval, the curve segment $K_{SG}$ is thereby generated.

As the result of the series of calculations, the cross sectional curve generating unit 4 b generates the cross sectional curve data constituting data on the curve segment $K_{SG}$ calculated for the corresponding corner and the data on straight line portion inputted as the basic outline K1.

Then, the routine goes to a next step SP 8 in which the data derived in the step SP 7 is displayed on the display unit 3 as the cross sectional shape data.

Consequently, the designer can visually inspect the cross sectional shape formed so as to inscribe the basic outline K1 through the display screen of the unit 3. The designer, thus, designs step by step, the cross sectional outer shape to a exactly the desired form by repeatedly inputting processed data to correct the outer shape displayed on the screen of the display unit 3.

Next, in a step SP 9 in FIG. 7 (B), the cross sectional curve generating unit 4 b waits to determine whether the designer corrects the undeformed straight portion from among the straight line portions of the basic outline K1 (not deformed by the above-described steps till step SP 7), and the routine goes to step SP 10 when the designer inputs, via the input unit 2, a correction instruction to correct the undeformed straight line portion.

In the step SP 10, the designer inputs the position data of the straight line portion to be corrected and then inputs the correction data to deform the straight line portion to an arc shape. The contents of correction is such that the deforming control point $P_{DM}$ placed on both ends of the straight line portion 1 on the basic outline K1 is set as reference control points $P_0$ and $P_3$ and the positions of, for example, four control points are specified between the reference control points $P_0$ and $P_3$ so that the straight line portion 1 is modified to a predetermined arc portion as denoted by a dot line in FIG. 5.

When the input of data has ended in the step SP 10, the cross sectional curve generating unit 4 b generates the curve data in place of the straight line portion data on the basis of the positions of the reference control points $P_0$ and $P_3$ and control points $P_1$ and $P_2$ in the step SP 11 using the equation (3). Thereafter the cross sectional shape, including data generated in the step SP 12, is displayed on the display unit 3.

Hence, the designer can visually inspect the cross sectional outer form having the straight line portion corrected to the arc shape, the basic outline K1 not deformed, and the arc-formed curve segment $K_{SG}$ generated at the corner.

The process series described above is a processing routine for the case where the corrected portion is present at the straight line portion in the above-described step SP 9. When the negative acknowledgement instruction is inputted in step SP 9 by the designer, the cross sectional curve generating unit 4 b immediately transfers to step SP 13 where unit 4 b determines if another portion of the basic outline K1 should be corrected.

In step 13 when the positive acknowledgement (Yes) is received by unit 4 b in response to the determination of whether the correction except the straight line portion is present, the routine goes to step SP 14. At step 14, the portion to be further corrected other than the straight line portion is specified, and the unit 4 b waits for the input of the data on the corrected portion now processed.

When the input of the corrected data has ended in step SP 14, the correction processing for the cross sectional curve is executed on the basis of the data to be inputted in step SP 15. Thereafter, the routine goes to the next step SP 16 where the corrected cross sectional curve is displayed on the display unit 3 and thereafter the routine returns to step SP 9 described above.

In addition, when a negative acknowledgement instruction (No) is inputted at step SP 14, the routine goes to step SP 17 and the routine ends.

Therefore, the designer can finally view the cross sectional curve by generating the curve segment inscribing the corner portion of the basic outline K1 based upon the basic outline K1 data. Hence, the designer can previously specify the finished dimension of the cross sectional outer shape after end of the design before the designer's designing operation is started. Hence, the design operation of the cross sectional shape can be more remarkably facilitated.

In this addition, since the correction processing for the basic outline can be done wherein the curve segment $K_{SG}$ and the remaining undeformed straight portion are modified locally, the cross sectional outer shape can be gradually and partially corrected and the designing operation can be carried out such that the design of the cross sectional shape may be continuously corrected with this stepwise to approach until the desired profile is obtained.

Although, in the preferred embodiment, the series of processings where the arc shape is set as the curve segment $K_{SG}$ has been described, the shape of the curve segment $K_{SG}$ can arbitrarily be set to a free curve according to the designer's requirement by inputting data on an arbitrary control points $P_1$ and $P_2$ in place of the radius data.

Although, in the above-described preferred embodiment which the plurality of line segments extend in the x axis direction and y axis direction are used to constitute the basic outline K1, the direction toward which each line segment is extended is not limited. An arbitrary line segment which extends in an oblique direction, with respect to the x or y axis direction, may be used instead. In addition, an arbitrary curve not limited to the straight line may be used to constitute the basic outline K1.

Furthermore, although in the above-described preferred embodiment, as shown in FIGS. 5 and 6, two control points are provided between the deforming control points $P_{DM}$ set on the basic outline K1 so as to generate the single curve segment $K_{SG}$, the deforming control points $P_{DMX}$ may be specified at positions not on the basic outline K1 but between the deforming control points $P_{DM}$. Then, the curve segment may be generated between these deforming control points $P_{DM}$ and $P_{DMX}$, respectively. In this case, the same effects as those described above can be achieved.

Next, a method for rearranging the cross sectional curve $S_C$ already generated in the x-y coordinate system in the x-y-z coordinate system will be described with chief reference to FIG. 8.

Figure 8:
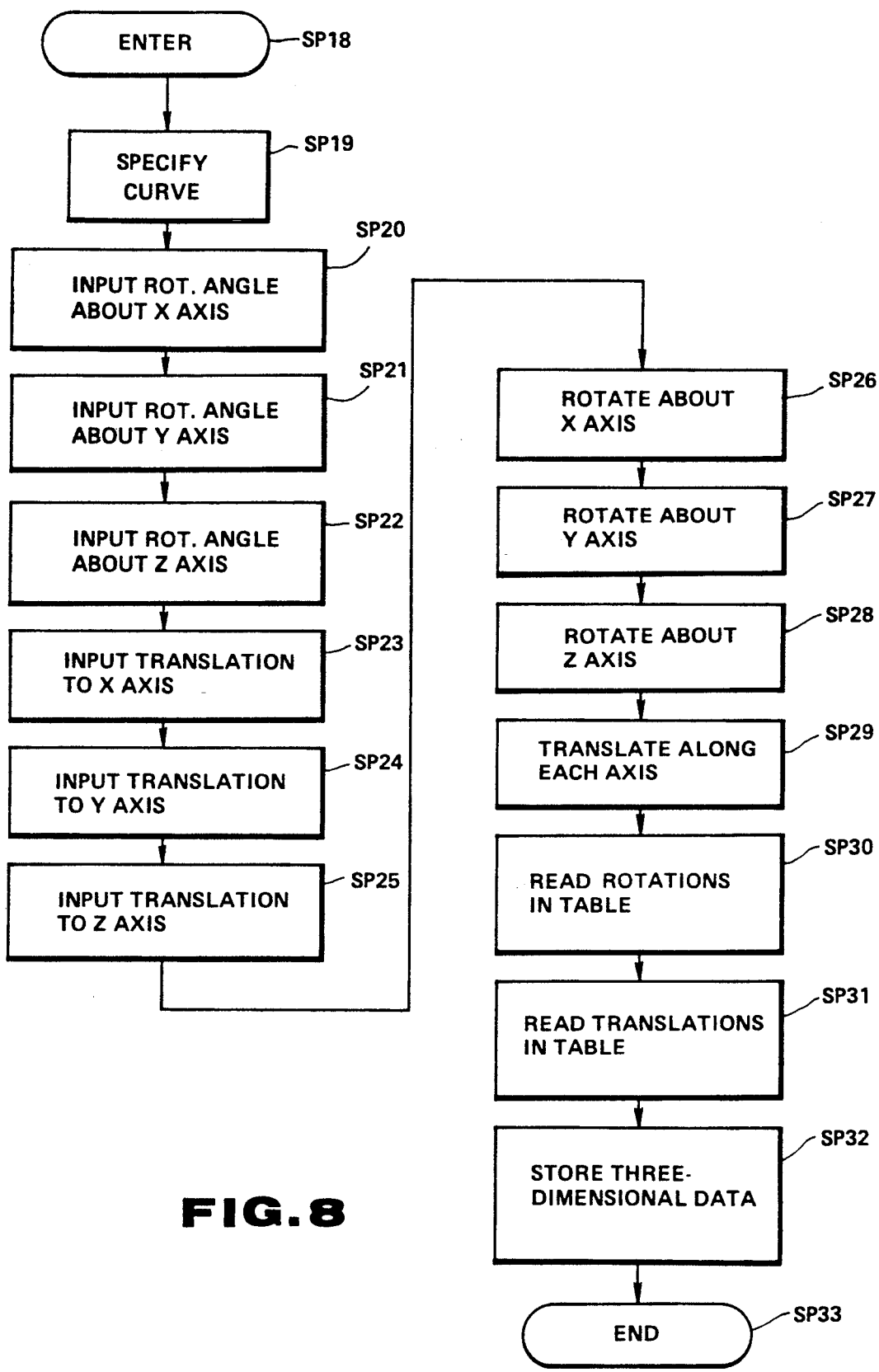
FIG. 8 is a flowchart for explaining a procedure for arranging one cross sectional curve at a desired position in the x-y-z coordinate system.

Through the arithmetic operation processing unit 4, the designer specifies (selects) a desired cross sectional curve $S_{C1}$ from among a plurality of cross sectional curves $S_{Ci}$ generated in the procedure described above in a step SP 19, after the start of the routine shown in FIG. 8 in a step SP 18.

In step SP 20 of FIG. 8, the arithmetic operation processing unit 4 receives rotations (also called an angular displacement or rotation quantity) through which the cross sectional curve $S_{C1}$ is rotated with the x axis as a center of rotation.

In the following step SP 21, the rotations with the y axis as a center of rotation are inputted and in the next step SP 22, the rotations with the z axis as the center of rotation are inputted.

In this way, a gradient of the cross sectional curve $S_C$ required for the designer when the cross sectional curve $S_C$ is arranged in the x-y-z coordinate system can be specified as the rotations with the x axis, y axis, and z axis as the respective centers of rotations.

Then, the arithmetic operation processing unit 4 receives parallel translations (also called a parallel translation quantity) in the x axis direction in step SP 23 parallel translation in the y axis direction in step SP 24. In the steps SP 23–SP 24–SP 25, the parallel translations from the original position to the arranged position required for the designer when the cross sectional curve $S_c$ is arranged in the x-y-z coordinate system are specified, separating into coordinate components in the x axis, y axis, and z axis directions.

In the arithmetic operation processing unit 4 in step SP 26, the coordinate transformation unit 4 c rotates the control points constituting the cross sectional curve $S_C$ through the rotations inputted in the step SP 20 with the x axis as the center of rotation.

Each curve segment $K_{SG}$ constituting the cross sectional curve $S_C$ can be represented by the four control points, as expressed by equation (1), so that the control points thereof are moved to enable the movement of the cross sectional curve.

In a step SP 27, the coordinate transformation unit 4 c rotates the control points $P_0$ to $P_3$ through the rotations inputted in the step SP 21 with the y axis as the center of rotation, the control points $P_0$ to $P_3$ being rotated with the x axis as the center of rotation.

In a step SP 28, the coordinate transformation unit 4 c rotates the control points $P_0$ to $P_3$ through the rotations inputted in the step SP 22 with the z axis as the center of rotation, the control points being rotated with the y axis as the center of rotation.

The control points $P_0$ to $P_3$ can be rotated on the basis of the rotation data inputted in the steps SP 20, SP 21, and SP 22. If the cross sectional curve $S_C$ is constructed by the cross sectional curve generating unit 4 b on the basis of the control points $P_0$ to $P_3$, then the cross sectional curve $S_C$ is inclined with respect to the origin 0, through an angle required by the designer, when the cross sectional curve is arranged in the x-y-z coordinate system.

In step SP 29, the coordinate transformation unit 4 c translates parallel the control points $P_0$ to $P_3$ which have been rotated in the x, y and z axis directions, respectively, on the basis of the parallel translations inputted in steps SP 23, SP 24, and SP 25.

Hence, it is noted that the respective control points $P_0$ to $P_3$ are arranged at predetermined positions in the x-y-z coordinate system after the parallel translation rotated points and the cross sectional curve generating unit 4 b generates the cross sectional curve on the basis of the control points $P_0$ to $P_3$.

In steps SP 30, SP 31, and SP 32, the arithmetic operation processing unit 4 stores the input data and the calculated data used in the series of processings into the memory 4g.

That is to say, data indicating the position of the control points of curve segments $K_{SG}$ (which constitute the cross sectional curve $S_{C1}$, $S_{C2}$, and $S_{C3}$) are stored for each curve segment into a segment storage area 5 of the x-y coordinate system in the memory 4 g shown in FIG. 9 as a segment data $D_{xy}$. It is noted that the straight line portion 1 shown in FIG. 5 is also treated as one of the curve segments.

The head address of the segment data $D_{xy}$ corresponding to each cross sectional curve $S_{C1}$, $C_{C2}$, and $S_{C3}$, and the data representing the number of the segment data are stored into a segment data head address storage area 6 and data storage area 7 for the number of segment data of the memory 4 g, respectively, as shown in FIG. 9. Hence, the head address of the storage area storing the segment data $D_{xy}$ (of the curve segment constituting each cross sectional curve $S_{C1}$, $S_{C2}$, and $S_{C3}$) and the number of the segment data can be determined.

Furthermore, the rotations derived in the steps SP 20-SP 21-SP 22 are stored in a rotation storage area 8 for each of the x axis, y axis, and z axis components. The parallel translations derived in steps SP 23-SP 24-SP 25 are stored into a parallel translation storage area 9 for each of x axis, y axis, and z axis components. Thus, the movement data required when the cross sectional curve generated in the x-y coordinate system is rearranged in the x-y-z coordinate system can be recorded.

The segment data of each curve segment $K_{SG}$ constituting the corresponding cross sectional curve $S_{C1}$, $S_{C2}$, and $S_{C3}$ are expressed by two expression forms: the segment data $D_{xy}$ (required in the x-y coordinate system when the cross sectional curves $S_{C1}$, $S_{C2}$, and $S_{C3}$ are formed in the x-y coordinate system) and the segment data $D_{xyz}$ (derived in the x-y-z coordinate system when the curves $S_{C1}$, $S_{C2}$, and $S_{C3}$ are rearranged in the x-y-z coordinate system). The segment data $D_{xyz}$ are stored in a segment data storage area 10 in the x-y-z coordinate system as shown in FIG. 9.

Hence, the control point data of three, two, and five curve segments as the segment data $D_{xy}$ and $D_{xyz}$ constituting the cross sectional curves $S_{C1}$, $S_{C2}$, and $S_{C3}$ are stored into the segment data storage area 5 in the x-y coordinate system and the segment data storage area 10 in the x-y-z coordinate system.

Thereafter, the routine goes to step SP 33 and the routine shown in FIG. 8 ends.

The arithmetic operation processing unit 4 forms the cross sectional curve in the x-y-z coordinate system on the basis of the segment data $D_{xyz}$ in the x-y-z coordinate system via the cross sectional curve generating unit 4 b and displays the formed cross sectional curve on the display unit 3.

In the way described above, the cross sectional curve $S_C$ can be arranged in the desired position of the three dimensional space specified by the designer. The interpolation unit 4 d shown in FIG. 1 carries out the interpolation calculation to place a curve patch to derive the outer shape of a product represented by a three-dimensional free curved surface.

In this case, for each cross sectional curve $S_{Ci}$ (i = 1, 2, 3, - - -) the segment data $D_{xy}$ in the x-y coordinate system is stored in the segment data storage area 5 in the x-y coordinate system of the memory 4 g; the parallel translations and rotations are stored, respectively, in the parallel translation storage area 9 and in the rotations storage area 8.

Thus, e.g., when the predetermined cross sectional curve $S_C$ is corrected so that the segment data $D_{XY}$ in the x-y coordinate system constituting the cross sectional curve $S_C$ to be corrected is loaded to correct the segment data $D_{xy}$ in a case where the outer profile of the free curved surface in the x-y-z coordinate system is corrected. Thereafter, the corrected segment data $D_{xy}$ is transformed into the segment data $D_{xyz}$ in the x-y-z coordinate system and stored into the segment data storage area 10 in the x-y-z coordinate system on the basis of the data stored in the parallel translations and rotations storage areas 9 and 8.

Hence, since it is not necessary to input the parallel translations and rotations repeatedly according to the necessities via the input unit 2, the correcting operation for the free curved surface can accordingly be simplified.

On the other hand, in a case where the free curved surface is corrected in the x-y-z coordinate system, the corrected segment data $D_{xyz}$ in the x-y-z coordinate system can be directly derived.

If the segment data $D_{xyz}$ is transformed on the basis of the stored parallel translations and rotations, the cross sectional shape of the corrected free curve can easily be derived in the x-y coordinate system.

Figure 10:
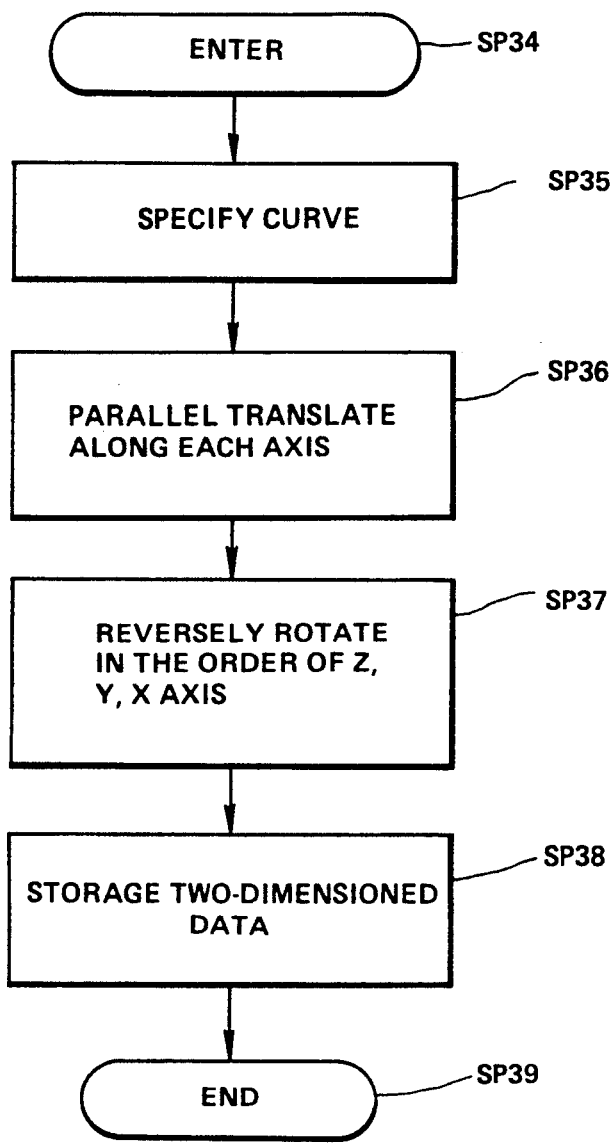
FIG. 10 is a flowchart for explaining a procedure for transferring one cross sectional curve arranged in the x-y-z coordinate system to the x-y coordinate system according to the present invention.

That is to say, as shown in FIG. 10, the routine executed in the arithmetic operation processing unit 4 goes from step SP 34 to step SP 35. At step 35, the cross sectional curve $S_C$ is specified; the controlling unit 4 h is loaded with the segment data $D_{XYZ}$ in the x-y-z coordinate system of the cross sectional curve, the parallel translations, and rotations from the memory 4 g; and the controlling unit 4 h supplies them into the coordinate transformation unit 4 c.

Next, the routine goes to a step SP 36 in which the coordinate transforming unit 4 c carries out the parallel translations for the segment data $D_{XYZ}$ in the x-y-z coordinate system on the basis of data representing the supplied parallel translations. Then, the routine goes to step SP 37 in which the cross sectional curve is rotated on the basis of the data representing the supplied rotations.

In step SP 38, the segment data derived as the result of parallel translations and rotational translations is stored as the segment data $D_{xy}$ in the x-y coordinate system in the segment data storage area 5 in the x-y coordinate system and the routine goes to step SP 39 and the routine is ended.

In the way described above with reference to FIG. 8, the segment data $D_{xy}$ in the x-y coordinate system is derived representing the cross sectional form of the free curved surface corrected in the x-y-z coordinate system. The cross sectional curve generating unit 4 b forms the cross sectional curve $S_C$ on the basis of the segment data $D_{XY}$ in the x-y-z coordinate system and then outputs the curve $S_C$ to the display unit 3 to visually inspect the cross sectional shape of the corrected free curve.

Even if the free curved surface is corrected in the three dimensional space, the cross sectional curve can easily be derived in the x-y coordinate system.

Although the preferred embodiment the segment data $D_{xy}$ in the x-y coordinate system and the segment data $D_{xyz}$ in the x-y-z coordinate system are provided for each cross sectional curve, in the present invention either one of these segment data may be prepared according to their necessities.

For example, in a case where only the segment data in the x-y-z coordinate system is prepared and where the cross sectional curve $S_C$ is corrected in the x-y coordinate system, the segment data $D_{xy}$ in the x-y coordinate system is formed and corrected on the basis of the segment data $D_{xyz}$ in the x-y-z coordinate system. Thereafter, the corrected segment data $D_{xy}$ is transformed into the segment data $D_{xyz}$ in the x-y-z coordinate system.

Furthermore, although in the preferred embodiment the free curve constituted by the cross sectional curve using the vector function represented by the Bezier equation is expressed, the present invention can be applied to the free curve which may be expressed using another vector function such as a B-spline equation.

In addition, although the cross sectional curve $S_C$ is expressed by the curve, the present invention can be applied to an end portion of a product at which the free curve is formed.

Next, with reference to FIGS. 11 (A) and 11 (B), a method will be described below wherein the plurality of cross sectional curves $S_{Ci}$ (i=1, 2, 3, - - -) are arranged at arbitrary positions in the x-y-z coordinate system. The cross sectional curve $S_C$, represented by a cross sectional shape of the free curve is derived by a cut of the three-dimensional free curve which is formed by placing the patches between the cross sectional curves through the interpolation calculation of the interpolation unit $4d$ shown in FIG. 1. The cross sectional curve $S_c$, is transformed by the parallel translations and rotations to move to a reference plane in the x-y coordinate system.

Figure 11A:
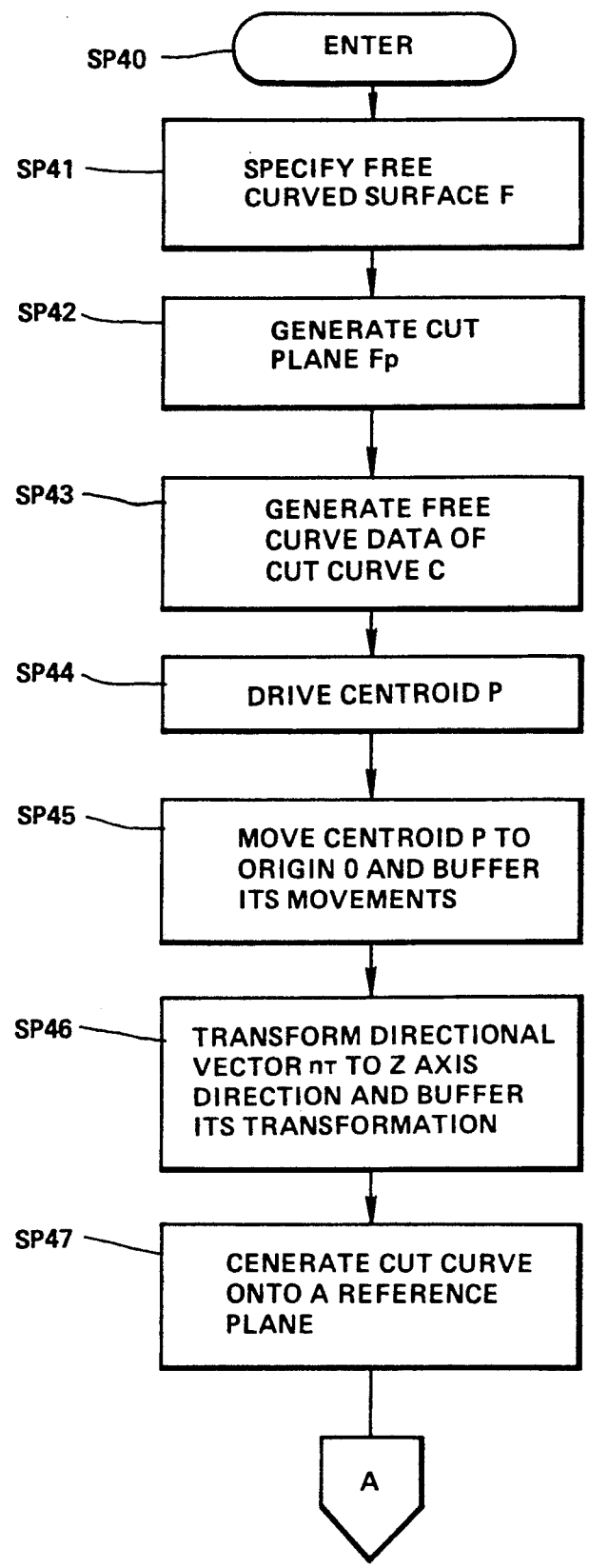
FIGS. 11 (A) and 11 (B) are integrally a flowchart for explaining a procedure for transforming one cross sectional curve representing the cross sectional shape of the free curved surface cut at the desired position to an x-y plane.
Figure 11B:
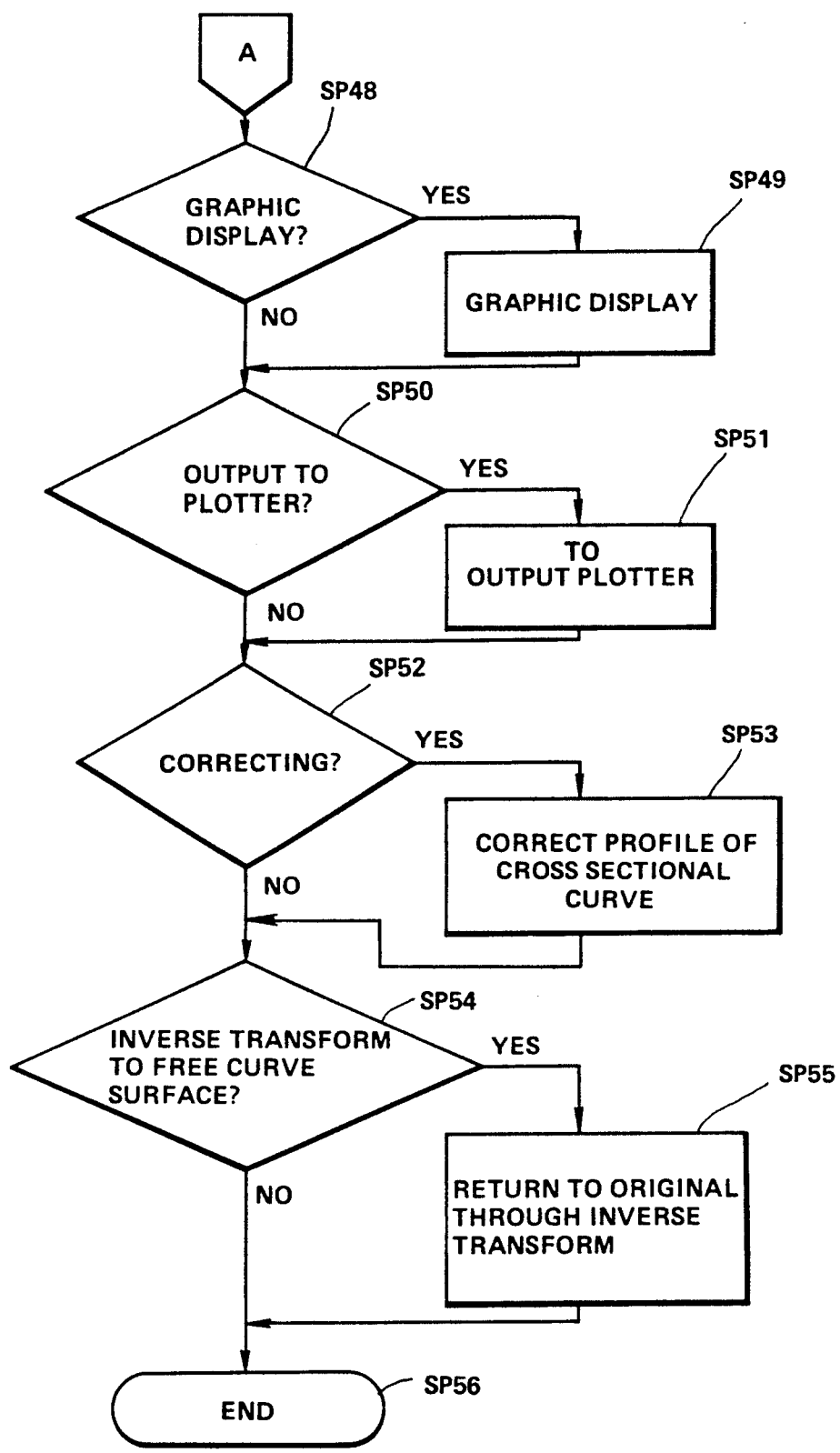

As shown in FIGS. 11 (A) and 11 (B), the arithmetic operation processing unit 4 starts the routine in step SP 40 and receives a specification of the free curved surface F used to derive the cross section in the x-y-z coordinate system according to the designer's input in input unit 2. Thereafter, the routine goes to step SP 42 to generate a cut plane $F_p$ through which the free curved surface F is cut as shown in FIG. 12.

In the preferred embodiment, the cut plane $F_P$ is generated by the designer inputting into the cut curve generating unit $4e$ of the arithmetic operation processing unit 4 of FIG. 1, one point in the x-y-z coordinate system and a direction from the point; two points in the x-y-z coordinate system; or three points in the x-y-z coordinate system.

Figure 12:
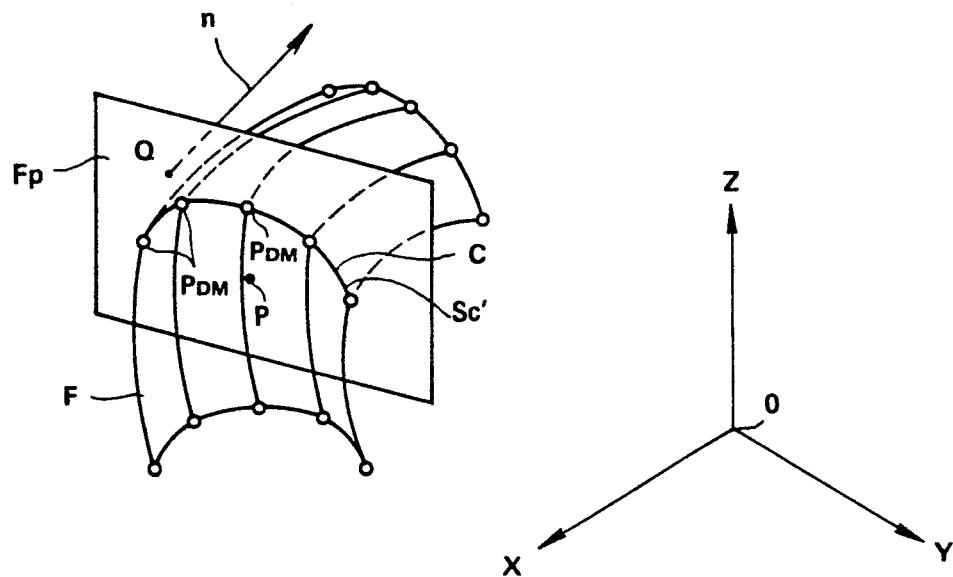
FIG. 12 is a schematic diagram representing an x-y coordinate state in which the free curved surface is cut at the desired position in the system, and a method for generating the free curved surface according to the present invention.

That is to say, in a case where one point and a direction from the one point are specified the cut plane $F_p$ is generated having a normal vector n whose direction passes through the specified point Q, as appreciated from FIG. 12. In a case where two points are specified the cut plane $F_p$ is generated having the normal vector n in the direction connecting the two points and passing through one of the two points specified. If the three points are specified, the cut plane $F_p$ is generated, passing through the three points.

Next, the routine executed in the arithmetic operation processing unit 4 shown in FIG. 1 goes to step SP 43 where the cut curve generating unit $4e$ derives a cut curve C obtained by cutting the free curved surface F through the cut plane $F_p$. The cross sectional curve C is derived by the approximation of the three-dimensional space curves in the Bezier equation.

Figure 13:
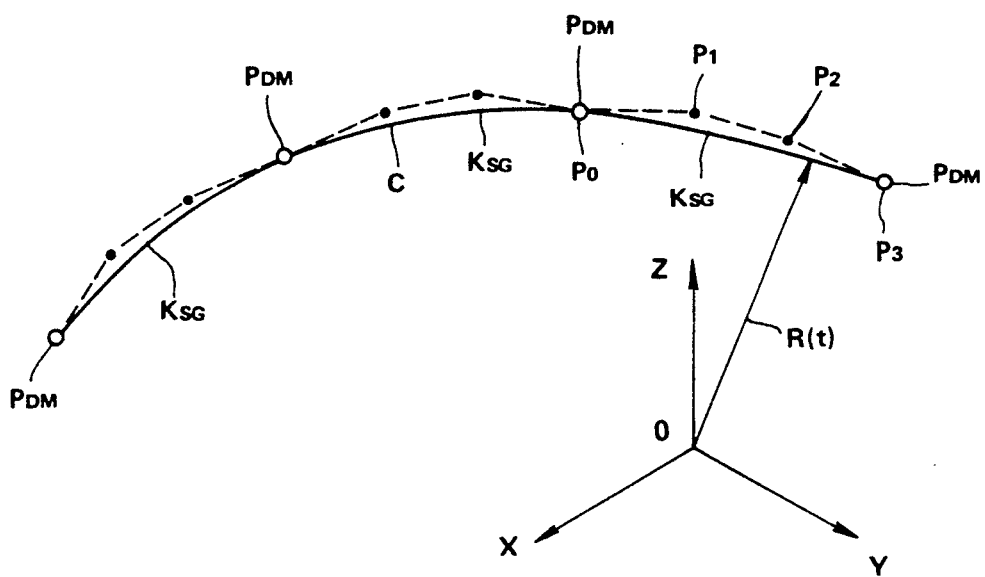
FIG. 13 is a schematic diagram representing an x-y-z coordinate state in which one curve is generated based on the position of a plurality of control points.

That is to say, as shown in FIG. 13, the deforming control points $P_{DM}$ are set at predetermined intervals on the cut curve C and the cut curve C is divided into the plurality of curve segments $K_{SG}$ using the deforming control point $P_{DM}$.

In addition, when further two control points $P_1$ and $P_2$ are specified between the reference control points $P_0$ and $P_3$ constituted by the one deforming control point $P_{DM}$ and by the other deforming control point $P_{DM}$, each curve segment $K_{SG}$ can be expressed in the equation (1).

In this way, the two control points $P_1$ and $P_2$ between the reference control points $P_0$ and $P_3$ are selected with the desired value according to the shape of the cut curve C. Each curve segment $K_{SG}$ can be expressed by the coordinate data of the reference control points $P_0$ and $P_3$ and control points $P_1$ and $P_2$.

The curve constituted by the plurality of curve segments $K_{SG}$ is called the cross sectional curve $S_C$, and can be expressed using the coordinate data for the control points $P_0$ to $P_3$ of the respective curve segments $K_{SG}$.

The cut curve generating unit $4e$ within the arithmetic operation processing unit 4 shown in FIG. 1 calculates the center of figure (centroid) P from the cross sectional curve $S_C$, shown in FIG. 12 in step SP 44 when the data representing the cross sectional curve $S_C$, is derived in the previous step SP 43.

In the arithmetic operation processing unit 4, the routine then goes to step SP 45 in which the movement detecting unit $4f$ calculates the distance from the center of figure P to the origin 0 in the x-y-z coordinate system and supplies the data of t he calculated distance to the coordinate transformation unit $4c$. The coordinate transformation unit $4c$ carries out the parallel translation of the respective control points $P_{DM}$, $P_1$, $P_2$ on the basis of the calculated result, so that the center of figure P coincides with the origin O, as appreciated from FIG. 14.

The distance of movement is stored as the parallel translation transformation data into the parallel translation storage area 8 of the memory $4g$ shown in FIG. 1, dividing into the coordinate components in the x, y, and z axis directions.

Figure 14:
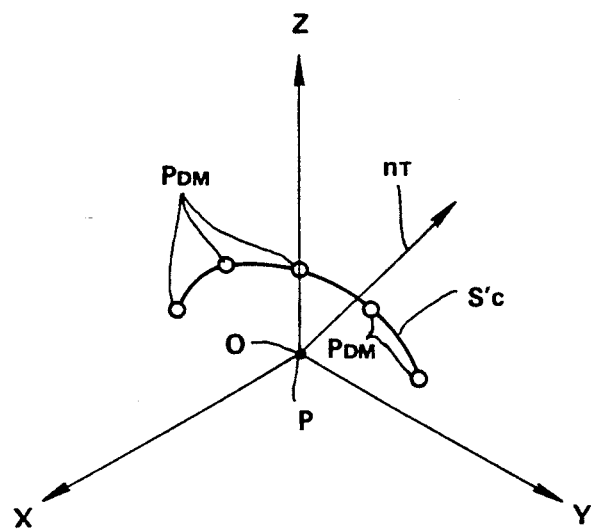
FIG. 14 is a schematic diagram representing an x-y-z coordinate state in which a reference point of the cross sectional curve representing the cross sectional shape when the free curved surface is cut at a desired position is matched with an origin of the x-y-z coordinate system in the system and method for generating the free curved surface, according to the present invention.
Figure 15:
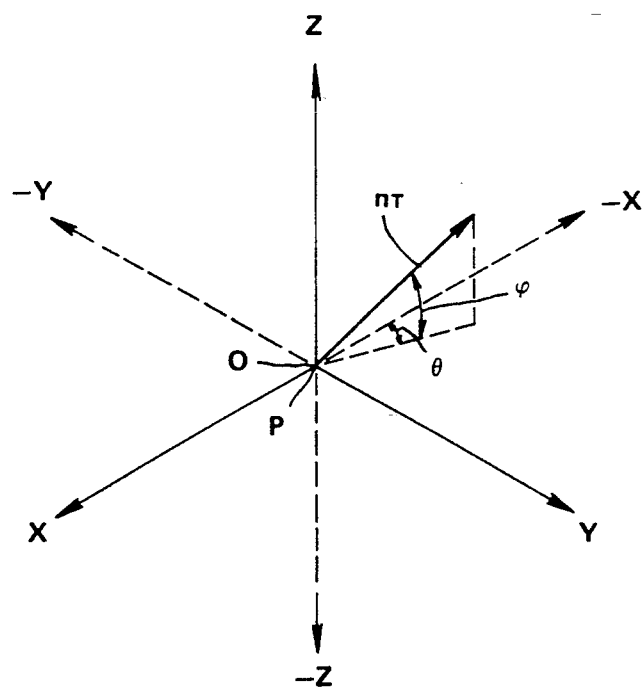
FIG. 15 is a schematic diagram for explaining a method for determining rotations of a cross sectional curve representing a cross sectional profile when the free curved surface is cut at the desired position to transform it into the x-y plane.

On the contrary, if a reverse translation of the cross sectional curve $S_C$, shown in FIG. 14, is transformed on the basis of the data representing the parallel translation stored in the parallel translation storage area 8 of the memory $4g$, the cross sectional curve $S_C$, is returned to the position shown in FIG. 12.

The routine, then, goes to step Sp 46 and the movement detecting unit $4f$ extends a directional vector $n_r$ representing the same direction as the normal vector n of the cut plane $F_p$ from the origin O and derives gradients $\phi$ and $\theta$ with respect to the x axis and y axis of the directional vector $n_r$. Thereafter, the directional vector $n_r$ is rotated with the origin 0 as the center so that the direction of the directional vector $n_r$ coincides with the positive direction of the z axis on the basis of the gradients $\phi$ and $\theta$.

Furthermore, the movements (rotations) when the directional vector $n_r$ is rotated are detected and the detected movements are separated into data of x, y, and z axis components with the x axis, y axis, and z axis as the center of rotations (hereinafter, referred to as rotations transformation data) and the data is stored into the rotations storage area of the memory $4g$. In addition, the rotation transformation data is supplied to the coordinate transformation unit $4c$. The coordinate transformation unit $4c$ carries out the rotations of the coordinates of the respective control points $P_{DM}$, $P_1$, and $P_2$ on the basis of the stored data on the rotations transformation.

Figure 16:
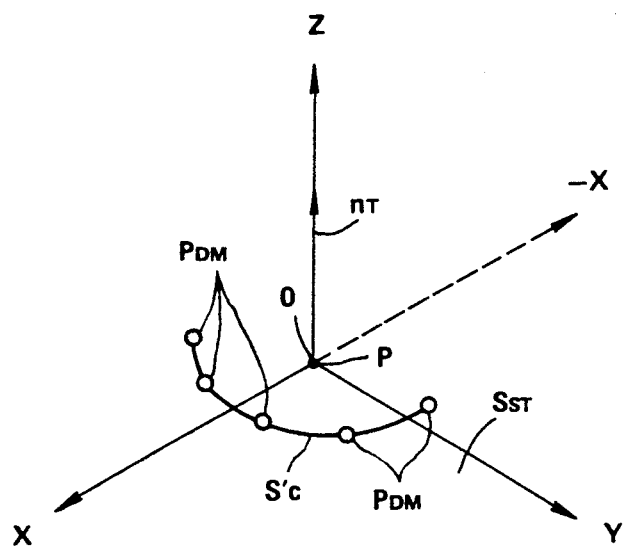
FIG. 16 is a schematic diagram representing an x-y-z coordinate state in which the cross sectional curve representing the cross sectional profile when a free curved surface is cut at the desired position is transferred into the x-y plane in the system and a method for generating the free curved surface, according to the present invention.
Figure 17:
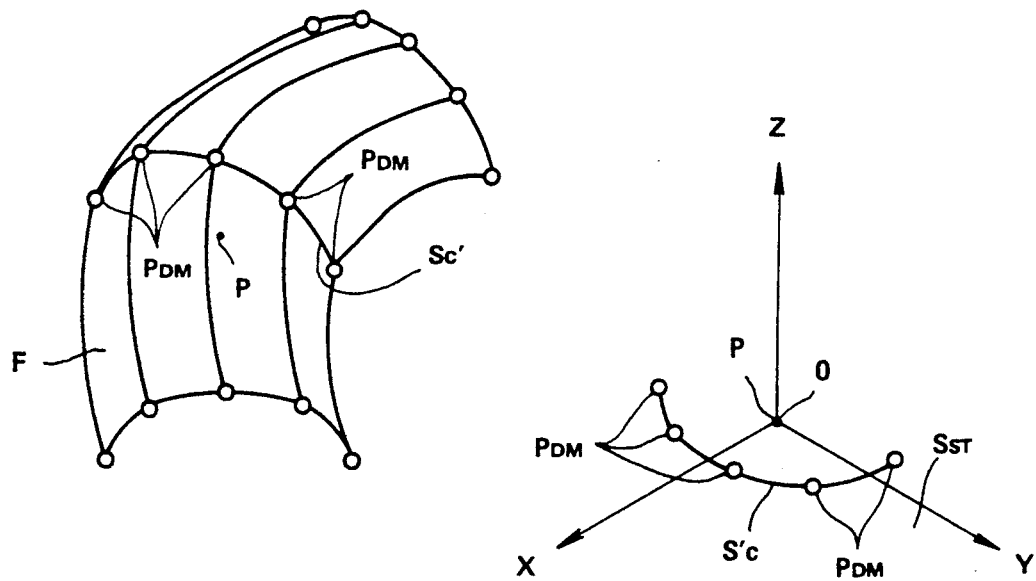
FIG. 17 is a schematic diagram representing an x-y-z coordinate state in which the cross sectional curve in the x-y plane is transferred to an original position in the x-y-z coordinate system in the system and method for generating the free curved surface, according to the present invention.

In a step SP 47, the cut curve generating unit $4e$ generates the cross sectional curve $S_C$, on the basis of each of the rotationally transformed control points $R_{DM}$, $P_1$, and $P_2$ so that the cross sectional curve $S_C$, can be derived on a reference plane $S_{ST}$ of x-y plane as shown in FIG. 16.

On the contrary, the reverse rotations transformation is carried out for the respective control points $P_{DM}$, $P_1$, and $P_2$ of the cross sectional curve $S_C$, by the coordinate transformation unit $4c$ on the basis of the rotations transformation data stored in the rotations storage area 9 of the memory $4g$, shown in FIG. 1, so that the cross sectional curve $S_C$, on the basic plane $S_{ST}$ is returned to a corresponding position shown in FIG. 14.

In the arithmetic operation processing unit 4, the routine then goes to step SP 48 in which the unit 4 determines whether the cross sectional curve $S_C$, is graphically displayed on the display unit 3. If a positive acknowledgement (Yes) is received in the step SP 48, the routine goes to step SP 49 where a two-dimensional cross sectional curve $S_C$ is displayed on the display unit 3 and the routine goes on to step SP 50.

If a negative acknowledgement (No) is received in step SP 48, the routine directly goes on to step SP 50.

In step SP 50, the unit 4 determines whether the cross sectional curve $S_C$, is outputted to a plotter. If a positive acknowledgement is received the routine goes to step SP 51 in which the cross sectional curve $S_C$, represented in the x-y coordinate system is outputted to the plotter on the basis of the data representing the cross sectional curve $S_C$, and the routine goes on to step SP 52.

If a negative acknowledgement is received in step SP 48, the routine directly goes to step SP 52. Thus, the cross sectional curve representing the cross sectional shape when the free curved surface expressed in the x-y-z coordinate system is cut through the desired cut surface can be moved into the x-y plane. If the cross sectional curve is, for example, outputted to the plotter or displayed on the display unit 3, the same two-dimensional image as the cross sectional shape viewed from a direction orthogonal to the cut cross sectional surface with the free curved surface cut at the desired cut surface.

In this way, in the two-dimensional image, the cross sectional shape of the free curve is expressed in the same expression form as the conventional drawing method thus confirming that the corrections and molding operations can be simplified.

Furthermore, with this method, since the parallel translations and rotations are calculated on the basis of the center of figure P and normal vector n, the cut plane is merely specified and inputted so that the cross sectional shape can be expressed easily on the x-y plane, thus, as a whole, achieving remarkable simplification of the correction operations for the designer.

Then, the routine goes to step SP 52 in which the arithmetic operation processing unit 4 determines whether a correction operation should be carried out.

In a case where the correction operation of the cross sectional form by the designer via the input unit 2 is carried out, step SP 52 determines the positive acknowledgement. In this case, the routine goes to step SP 53 in which the cross sectional data represented on the x-y plane is corrected by moving the positions of the respective control points $P_0$ to $P_3$ and goes on to step SP 54.

On the other hand, if negative acknowledgement is derived in the step SP 52, the routine goes directly to step SP 54.

In step SP 54, the arithmetic operation processing unit 4 determines whether the free curved surface should be reconstructed on the basis of the cross sectional curve $S_C$, represented on the reference plane $S_{ST}$. If a positive acknowledgement is received in the step SP 54, the routine goes to a step SP 55. At step 55, the coordinate transformation unit 4 c does a reverse transformation of the cross-sectional curve data on the basis of the parallel transformation data stored in the parallel translation storage area 8 and the rotations stored in the rotations storage area of the memory 4 g shown in FIG. 1.

Then, the cut curve generating unit 4 e within the arithmetic operation processing unit 4 generates the cross sectional curve $S_C$, on the basis of the respective control points $P_{DM}$, $P_1$, and $P_2$ transformed on the cut plane $F_P$. Then the free curved surface F is reconstructed by means of the interpolation unit 4 d on the basis of the cross sectional curve $S_C$.

In the way described above, the cross sectional shape is corrected, giving the same feeling to the designer as the conventional drawing method so that easy correction for the outer shape of the free curved surface can be carried out as compared with the conventional drawing method.

Upon the completion of the reconstruction of the free curved surface, the arithmetic operation processing unit 4 ends the whole series of processings described above in step SP 56.

If a negative acknowledgement (No) is received in step SP 54, the routine goes directly to step SP 56, in which the routine is ended.

It is noted that, although in the preferred embodiment the reference plane is set on the x-y plane, the reference plane may only be set at a desired position on the three-dimensional space according to necessity.

Although, in the preferred embodiment, the rotation transformations are carried out with the x axis and y axis as the respective centers of rotations, the y axis may be set as the center of rotation in place of the x axis and the center of rotation may be selected according to necessity.

Although, in the preferred embodiment, the cross sectional shape displayed is cut with a plane, the cross sectional shape may be cut with a curved surface. In this case, a technique of a perspective transformation may be used to represent the free curved surface on the reference plane in addition to the parallel translations and rotatons transformations.

Although in the preferred embodiment the cross sectional shape is outputted to the plotter and outputted to a graphic display unit, the present invention may be applied to cases where the output of the arithmetic operation processing unit 4 is supplied only to the plotter, only to the graphic unit, another type of display unit, or drawing processing unit.

In addition, although the cross sectional shape is corrected with data of the rotations and parallel translations, stored in the memory, the present invention may be applied to a case where the cross sectional shape is merely displayed.

Furthermore, although the cross-sectional shape is expressed in the three-dimensional free curve expressed by the Bezier equation in the preferred embodiment, the present invention may be applied to a case where the cross sectional shape is expressed in another three-dimensional free curve such as B-spline.

What is claimed is:

1. A system for interactively and electronically generating digital data representing a free curved surface in an x-y-z coordinate system, comprising:
   a) input means for supplying input digital data defining two dimensional shapes, rotation angles about the x, y and z axes, and translations of curves to the x, y and z axes;
   b) cross sectional shape generating means connected to the input means for electronically generating digital data defining a plurality of cross sectional curves in an x-y coordinate system;
   c) an electronic memory;
   b) coordinate system transforming means connected to the input means, the memory and the cross sectional shape generating means for receiving the digital data defining the plurality of cross sectional curves, the input data defining selected rotation angles about the x, y and z axes for the cross sectional curves in the x-y coordinate system, input data defining translation of the plurality of cross sectional curves to the x, y and z axes, and for thereafter generating, and then storing in the memory, data representing the plurality of cross sectional curves as rotated and translated according to the input data from the input means;

e) interpolation means supplied with the digital data output by the coordinate system transforming means for electronically interpolating digital data representing curved surface portions between the plurality of cross sectional curves and outputting digital data representing a corresponding free curved surface in the x-y-z coordinate system which is the sum of the curved surface portions; and f) wherein the coordinate system transforming means thereafter uses the stored digital data representing the parallel translations and rotations to electronically transform the digital data defining selected ones of the plurality of cross sectional curves from the x-y coordinate system to the x-y-z coordinate system or from x-y-z coordinate system back to the x-y coordinate system and output digital data defining curves corresponding to the selected cross sectional curves arranged at selected positions in the x-y-z coordinate system or the x-y coordinate system, respectively.

2. A system as set forth in claim 1, further comprising:

a) electronic display means connected to the interpolation means and supplied with the digital data representing the free curved surface in the x-y-z coordinate system for displaying this digital data as a visually perceptible free curved surface.

3. A system as set forth in claim 1, wherein the cross sectional shape generating means further comprises:

a) interactive input means, included in the input means, for allowing a user of the system to interactively input digital data defining the shape and position of one or more curves in the x-y coordinate system;

b) basic outline generating means, responsive to data input by the interactive input means, for electronically generating digital data representing a basic outline of a rough outer shape of one or more cross sectional curves in the x-y coordinate system; and c) cross sectional curve generating means for electronically specifying at least two control points on the basic outline and for electronically generating digital data representing a parametric curve between the control points; and d) display means connected to receive the digital data generated by the basic outline generating means and the cross sectional curve generating means for displaying the rough outer shape represented by the digital data from the basic outline generating means and the parametric curve represented by the digital data from the cross sectional curve generating means.

4. A system as set forth in claim 3, wherein the basic outline represented is a straight line.

5. A system as set forth in claim 3, wherein the parametric curve is a Bezier curve.

6. A system as set forth in claim 1, which further comprising:

a) cutting curve generating means connected to the interpolation means and supplied with its output digital data for electronically generating digital data representative of cutting the free curved surface formed in the x-y-z coordinate system at a desired position to derive a cut cross sectional curve; and b) means connected to the cutting curve generating means, and supplied with the digital data representing the cut cross sectional curve, and to the memory, and supplied with the stored digital data representing the parallel translations and rotations, for electronically transforming the digital data representing the cut cross sectional curve to the x-y coordinate system and to generate digital data representing the shape of the cut cross sectional curve in the x-y coordinate system.

7. A method for electronically generating digital data representing a free curve in an x-y-z coordinate system, comprising the steps of:

a) inputting digital data defining two dimensional shapes, rotation angles about the x, y and z axes, and translations of curves to the x, y and z axes;

b) electronically generating digital data defining a plurality of cross sectional curves in an x-y coordinate system;

c) storing in an electronic memory device digital data representing parallel translations and rotations of the plurality of cross sectional curves;

d) receiving digital data defining the plurality of cross sectional curves, input data defining selected rotation angles about the x, y and z axes for the cross sectional curves in the x-y coordinate system, input data defining translation of the plurality of cross sectional curves to the x, y and z axes, and thereafter generating, and subsequently storing in the electronic memory device, data representing the plurality of cross sectional curve as rotated and translated according to the input data;

e) electronically interpolating digital data representing curved surface portions between the plurality of cross sectional curves and outputting digital data representing a corresponding free curved surface in the x-y-z coordinate system which is the sum of the curved surface portions; and f) thereafter using the stored digital data representing the parallel translations and rotations to electronically transform the digital data defining selected ones of the plurality of cross sectional curves from the x-y coordinate system to the x-y-z coordinate system or from the x-y-z coordinate system to the x-y coordinate system and outputting digital data defining curves corresponding to the plurality of cross sectional curves arranged at selected positions in the x-y-z coordinate system or the x-y coordinate system, respectively.

8. A method as set forth in claim 7, wherein the step a) comprises the following steps:

a1) interactively inputting digital data defining the shape and position of one or more curves in the x-y coordinate system;

a2) using the interactively input digital data, electronically generating digital data representing a basic outline of a rough outer shape of one or more cross sectional curves in the x-y coordinate system; and a3) electronically specifying at least two control points on the basic outline and electronically generating digital data representing a parametric curve between the control points; and a4) displaying the rough outer shape represented by the digital data generated in step a2) and the parametric curve represented by the digital data generated in step a3).

9. A method as set forth in claim 7, further comprising the steps of:

g) electronically generating digital data representative of cutting the free curved surface formed in the x-y-z coordinate system to derive a cut cross sectional curve; and h) using the stored digital data representing parallel translations and rotations, electronically transforming the digital data representing the coordinates of the cut cross sectional curve to the x-y coordinate system to generate digital data representing the shape of the cut cross sectional curve in the x-y coordinate system.

10. A method as set forth in claim 7, further comprising the steps of:

g) electronically displaying the digital data representing the free curved surface in step f) as a visually perceptible free curved surface in the x-y-z coordinate system.

* * * * *